United States Patent
Nagasaka

(10) Patent No.: US 11,388,480 B2
(45) Date of Patent: Jul. 12, 2022

(54) INFORMATION PROCESSING APPARATUS, INFORMATION PROCESSING METHOD, AND PROGRAM

(71) Applicant: Sony Group Corporation, Tokyo (JP)

(72) Inventor: Hideo Nagasaka, Kanagawa (JP)

(73) Assignee: Sony Group Corporation

( * ) Notice: Subject to any disclaimer, the term of this patent is extended or adjusted under 35 U.S.C. 154(b) by 15 days.

(21) Appl. No.: 15/777,465

(22) PCT Filed: Sep. 28, 2016

(86) PCT No.: PCT/JP2016/004376
§ 371 (c)(1),
(2) Date: May 18, 2018

(87) PCT Pub. No.: WO2017/094212
PCT Pub. Date: Jun. 8, 2017

(65) Prior Publication Data
US 2018/0332357 A1    Nov. 15, 2018

(30) Foreign Application Priority Data

Nov. 30, 2015    (JP) .............................. JP2015-232729

(51) Int. Cl.
*H04N 21/482* (2011.01)
*G06F 16/68* (2019.01)
(Continued)

(52) U.S. Cl.
CPC ......... *H04N 21/4828* (2013.01); *G06F 16/00* (2019.01); *G06F 16/686* (2019.01);
(Continued)

(58) Field of Classification Search
CPC ............. H04N 21/4828; H04N 21/232; H04N 21/233; H04N 21/44008; H04N 21/4394;
(Continued)

(56) References Cited

U.S. PATENT DOCUMENTS 8,543,399 B2 *    9/2013    Jeong ..................... G10L 15/08
704/240
8,819,033 B2    8/2014    Itakura
(Continued)

FOREIGN PATENT DOCUMENTS

CN    1416112 A    5/2003
CN    1647073 A    7/2005
(Continued)

OTHER PUBLICATIONS

International Search Report corresponding to PCT/JP2016/004376, dated Oct. 25, 2016 (2 pg.).
(Continued)

*Primary Examiner* — Nathan J Flynn
*Assistant Examiner* — Christine A Kurien
(74) *Attorney, Agent, or Firm* — Lerner, David, Littenberg, Krumholz & Mentlik, LLP

(57) ABSTRACT

An information processing apparatus according to the present technology includes a reception unit, a first generation unit, a collection unit, and a second generation unit. The reception unit receives a content.

The first generation unit analyzes the received content and generates one or more pieces of analysis information related to the content. The collection unit collects content information related to the content on a network on the basis of the one or more pieces of generated analysis information. The second generation unit generates an utterance sentence on the basis of at least one of the one or more pieces of analysis information and the collected content information.

17 Claims, 8 Drawing Sheets

(51) Int. Cl.
*G06F 16/00* (2019.01)
*H04N 21/44* (2011.01)
*H04N 5/76* (2006.01)
*H04N 21/858* (2011.01)
*H04N 21/232* (2011.01)
*H04N 21/233* (2011.01)
*H04N 21/439* (2011.01)
*H04N 21/422* (2011.01)
*H04N 21/4788* (2011.01)

(52) U.S. Cl.
CPC ......... *H04N 21/232* (2013.01); *H04N 21/233* (2013.01); *H04N 21/42203* (2013.01); *H04N 21/4394* (2013.01); *H04N 21/44008* (2013.01); *H04N 5/76* (2013.01); *H04N 21/4788* (2013.01); *H04N 21/858* (2013.01)

(58) Field of Classification Search
CPC ............... H04N 21/42203; H04N 5/76; H04N 21/4788; H04N 21/858; G06F 16/00; G06F 16/686
See application file for complete search history.

(56) References Cited

U.S. PATENT DOCUMENTS

| | | | | |
|---|---|---|---|---|
| 10,783,159 | B2* | 9/2020 | Boston | G06F 16/248 |
| 2003/0088399 | A1* | 5/2003 | Kusumoto | H04N 21/482 704/10 |
| 2011/0213773 | A1* | 9/2011 | Kobayashi | H04N 21/47 707/736 |
| 2014/0164401 | A1* | 6/2014 | Kyaw | G06F 16/9535 707/751 |
| 2016/0179801 | A1* | 6/2016 | Venkataraman | G06F 16/48 707/771 |

FOREIGN PATENT DOCUMENTS

| | | | |
|---|---|---|---|
| CN | 1901638 | A | 1/2007 |
| CN | 102169489 | A | 8/2011 |
| CN | 104683852 | A | 6/2015 |
| JP | 2004362280 | A * | 12/2004 |
| JP | 2004362280 | A | 12/2004 |
| JP | 2008131491 | A | 6/2008 |
| JP | 2011180729 | A | 9/2011 |
| JP | 2014016689 | A | 1/2014 |
| JP | 2015144398 | A | 8/2015 |
| JP | 2015194864 | A | 11/2015 |
| WO | 2015179431 | A1 | 11/2015 |

OTHER PUBLICATIONS

Notification of First Office Action including Search Report for Chinese Application No. 2016800684639 dated Apr. 26, 2021; 14 pages.

* cited by examiner

INFORMATION PROCESSING APPARATUS, INFORMATION PROCESSING METHOD, AND PROGRAM

CROSS-REFERENCE TO RELATED APPLICATIONS

This application is a national phase entry under 35 U.S.C. § 371 of International Application No. PCT/JP2016/004376 filed Sep. 28, 2016, which claims the priority from Japanese Patent Application No. 2015-232729 filed in the Japanese Patent Office on Nov. 30, 2015, the entire contents of which are hereby incorporated by reference.

TECHNICAL FIELD

The present technology relates to an information processing apparatus, an information processing method, and a program that structure an audio interaction system.

BACKGROUND ART

In a program accumulation device described in Patent Literature 1, data obtained by converting all audio emitted in a received broadcast program into texts is stored in a storage medium. When a keyword of a program desired to be viewed by a user is input, programs in which the keyword exists are searched for. In a case where a program including the keyword input by the user is found, one sentence including the keyword or the like is reproduced by audio emitted in the program. As a result, the user can easily search for a desired program (paragraphs [0014] to [0018] in specification of Patent Literature 1 etc.).

Further, Patent Literature 1 also describes a configuration in which, when converting all audio emitted in a broadcast program into texts, the audio is made into a database while being classified into "question" or "answer". For example, when a keyword is input by the user through an audio interface, an optimum response keyword for the keyword is selected, and a program including the response keyword is searched for. In a case where a program including the response keyword is found, one sentence including the response keyword or the like is reproduced by audio emitted in the program. Accordingly, the user can search for a desired program on the basis of a pseudo conversation with the program accumulation device (paragraphs [0019] to [0023] in specification of Patent Literature 1 etc.).

CITATION LIST

Patent Literature

Patent Literature 1: Japanese Patent Application Laid-open No. 2004-362280

DISCLOSURE OF INVENTION

Technical Problem

For example, realization of the program search based on a pseudo conversation as described in Patent Literature 1 enables a user to enjoy a program more. A technology for providing a high-quality viewing experience to users viewing contents are expected to be required in the future.

In view of the circumstances as described above, an object of the present technology is to provide an information processing apparatus, an information processing method, and a program that enable a high-quality viewing experience to be provided to a user viewing a content.

Solution to Problem

To attain the object described above, an information processing apparatus according to an embodiment of the present technology includes a reception unit, a first generation unit, a collection unit, and a second generation unit.

The reception unit receives a content.

The first generation unit analyzes the received content and generates one or more pieces of analysis information related to the content.

The collection unit collects content information related to the content on a network on the basis of the one or more pieces of generated analysis information.

The second generation unit generates an utterance sentence on the basis of at least one of the one or more pieces of analysis information and the collected content information.

In this information processing apparatus, the content information on a network is collected on the basis of the one or more pieces of analysis information related to the content. In addition, the utterance sentence is generated on the basis of the one or more pieces of analysis information or content information. Accordingly, it becomes possible to make a conversation on various types of information related to the content, with the user viewing the content. As a result, a high-quality viewing experience can be provided to the user.

The content may be a program content. In this case, the first generation unit may generate one or more keywords related to the content by analyzing each of a plurality of types of information included in the program content.

Accordingly, content information on a program content can be collected with high accuracy. Further, it also becomes possible to have a conversation with the user about a content of the program content.

The second generation unit may select an utterance keyword from the one or more generated keywords and generate the utterance sentence including the utterance keyword and a related keyword related to the utterance keyword.

Accordingly, it becomes possible to realize a conversation related to the program content, and thus, the user can view the program content with more interest.

The second generation unit may set the related keyword on the basis of the collected content information.

Accordingly, it becomes possible to create an utterance sentence reflecting contents of comments or the like posted on the network, for example, and thus, the user can enjoy the program content more while having a conversation.

The second generation unit may set a keyword that co-occurs with the utterance keyword as the related keyword.

Accordingly, an utterance sentence can be generated with ease.

The generation unit may be capable of acquiring a content of audio included in the program content. In this case, the second generation unit may set the related keyword on the basis of a content of audio including the utterance keyword.

Accordingly, it becomes possible to generate an utterance sentence that follows the content of the program content.

The information processing apparatus may further include a detection unit capable of detecting a scene switch in the program content, and a judgment unit that judges an effectivity of each of the one or more generated keywords on the basis of the detected scene switch. In this case, the second generation unit may generate the utterance sentence on the basis of a keyword judged as effective by the judgment unit.

Accordingly, content information can be collected with high accuracy in accordance with the scene switch. Further, it becomes possible to generate an utterance sentence corresponding to the scene switch.

The information processing apparatus may further include an acquisition unit that acquires preference information of a user viewing the content. In this case, the second generation unit may select, in a case where the one or more generated keywords include a keyword related to the preference information, the keyword as the utterance keyword.

Accordingly, a conversation related to a user preference becomes possible.

The information processing apparatus may further include a setting unit that sets an utterance timing at which the generated utterance sentence is to be uttered.

Accordingly, it becomes possible to start a conversation at an appropriate timing for the user viewing the content.

The setting unit may set a timing of the scene switch as the utterance timing.

Accordingly, it becomes possible to start a conversation at a timing of the scene switch without inhibiting viewing of the content.

The second generation unit may select, in a case where the one or more generated keywords include a keyword related to the preference information, the keyword as an utterance keyword. In this case, the setting unit may set a timing at which the utterance sentence including the keyword related to the preference information is generated, as the utterance timing.

In a case where a keyword that meets the preference information of the user is generated, an utterance sentence including the keyword is immediately uttered. Accordingly, it becomes possible to start a conversation related to what the user prefers at a timing at which the preferred thing appears.

The collection unit may collect comments that are related to the one or more generated keywords and have been posted using a communication service. In this case, the setting unit may set the utterance timing on the basis of the collected number of posted comments related to an utterance keyword selected by the second generation unit.

Accordingly, for example, it becomes possible to start a conversation with the user at a timing at which contents related to the utterance keyword are livened up in the service described above.

The acquisition unit may acquire the preference information on the basis of an answer to the utterance sentence.

Accordingly, it becomes possible to acquire information with high accuracy regarding the preference of the user viewing the content, for example.

The content may be a captured content captured by an image pickup apparatus. In this case, the first generation unit may generate one or more keywords related to one or more subjects included in the captured content by analyzing the captured content. Further, the second generation unit may generate the utterance sentence on the basis of at least one of the one or more generated keywords and the content information collected on the basis of the one or more keywords.

Accordingly, it becomes possible to make a conversation on the subject that appears in the captured content.

An utterance content of a user viewing the content including an answer to the utterance sentence may be analyzed, to judge a target of interest of the user and provide information related to the target of interest.

Accordingly, an interest of the user becomes deeper, and viewing of the program content becomes fun.

The information related to the target of interest may include information that enables the target of interest to be purchased, information that enables the user to meet the target of interest, information that enables the user to go to the target of interest, and information that enables the user to learn the target of interest.

Accordingly, an interest of the user becomes deeper, and viewing of the program content becomes fun.

An information processing method according to an embodiment of the present technology is an information processing method executed by a computer, including receiving a content.

The received content is analyzed and one or more pieces of analysis information related to the content are generated.

Content information related to the content on a network is collected on the basis of the one or more pieces of generated analysis information.

An utterance sentence is generated on the basis of at least one of the one or more pieces of analysis information and the collected content information.

A program according to an embodiment of the present technology is a program that causes a computer to execute the following steps.

The step of receiving a content.

The step of analyzing the received content and generating one or more pieces of analysis information related to the content.

The step of collecting content information related to the content on a network on the basis of the one or more pieces of generated analysis information.

The step of generating an utterance sentence on the basis of at least one of the one or more pieces of analysis information and the collected content information.

Advantageous Effects of Invention

As described above, according to the present technology, it becomes possible to provide a high-quality viewing experience to a user viewing a content. It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

First Embodiment (Audio Interaction System)

Figure 1:
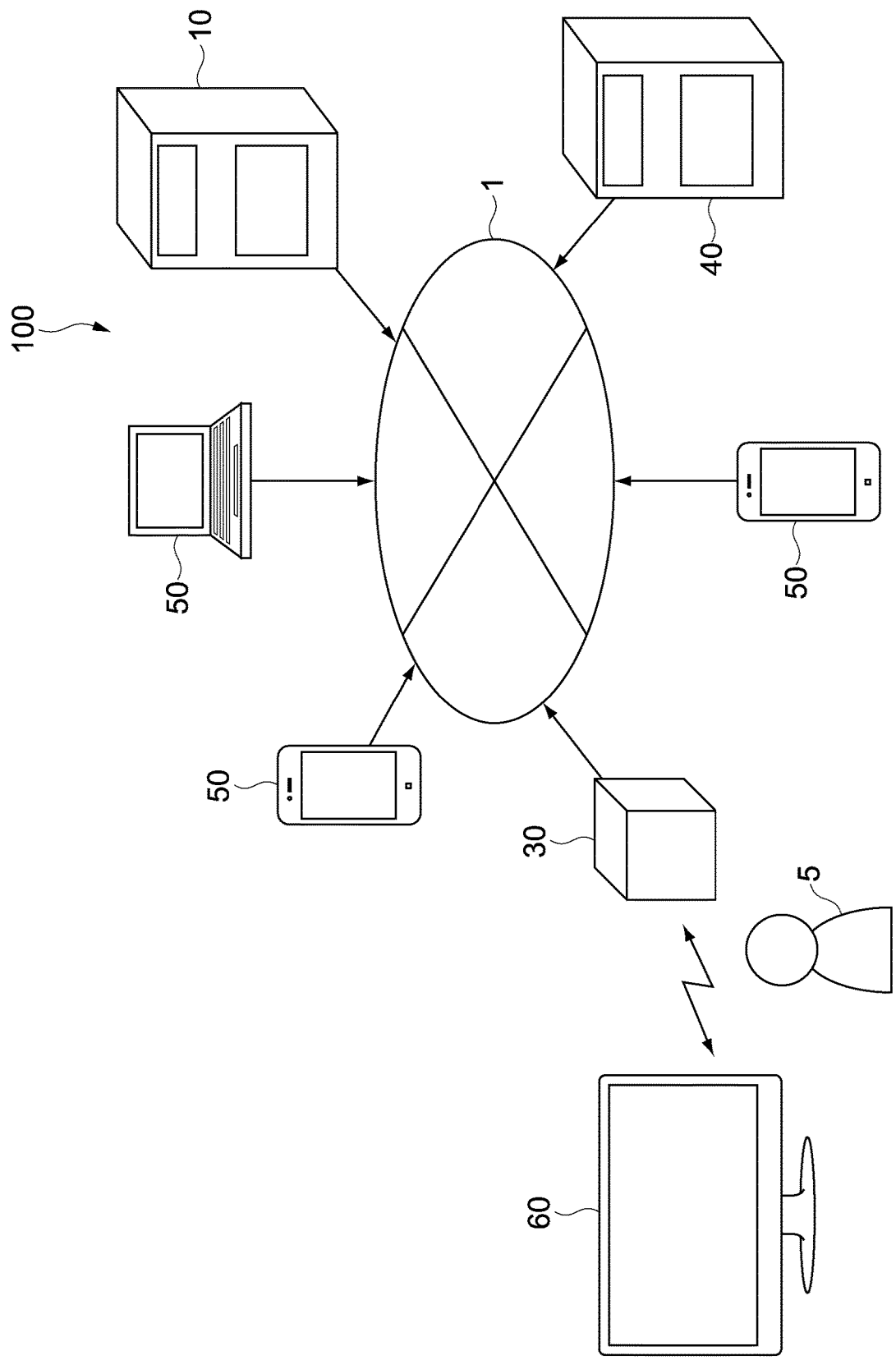
[FIG. 1] A schematic diagram showing a configuration example of an audio interaction system according to a first embodiment.

FIG. 1 is a schematic diagram showing a configuration example of an audio interaction system according to this embodiment. An audio interaction system 100 includes an information collection server 10, a audio interaction apparatus 30, an SNS (Social Networking Service) server 40, and SNS user terminals 50. These apparatuses are communicable with one another via a network 1.

Typically, a WAN (Wide Area Network) such as the Internet is used as the network 1, but a LAN (Local Area Network) such as an intranet may be used instead. In addition, a protocol for structuring the network 1 is not limited.

The information collection server 10 receives a program content of television broadcast and the like, analyzes the program content, and generates one or more keywords (hereinafter, referred to as analysis keywords), for example. Moreover, content information related to the program content is collected via the network 1. The generated one or more analysis keywords and the collected content information are transmitted to the audio interaction apparatus 30.

The audio interaction apparatus 30 is an apparatus for performing a conversation (interaction) on various types of information related to a program content with a user 5 who viewing the program content. The audio interaction apparatus 30 generates an utterance sentence on the basis of at least one of the one or more analysis keywords and the content information transmitted from the information collection server 10. The generated utterance sentence is output to the user 5 via a speaker or the like, and a conversation related to the program content is started.

The audio interaction apparatus 30 is provided near the user 5 viewing the program content. In addition, the audio interaction apparatus 30 is communicably connected to a television apparatus 60 that broadcasts program contents. The connection is realized by short-range wireless communication such as Bluetooth (registered trademark) or wireless LAN communication such as WiFi.

The SNS server 40 provides a communication service that allows an unspecified number of service users to post comments via the network 1. The communication service according to the present technology includes various SNSs such as Twitter (registered trademark). Hereinafter, descriptions will be made while referring to the communication service as SNS.

The SNS user terminal 50 is a terminal used by an SNS user using the SNS. For example, the SNS user acquires an SNS account using the SNS user terminal 50. The SNS can be used by logging in using the SNS account.

The information collection server 10, the audio interaction apparatus 30, the SNS server 40, and the SNS user terminal 50 are constituted of various computers such as a PC (Personal Computer), a smartphone, and a tablet terminal. In other words, each apparatus includes hardware requisite for configuring a computer, such as a CPU, a ROM, a RAM, and an HDD.

Information processing carried out by each of the apparatuses is realized by software stored in the ROM, the HDD, and the like in cooperation with hardware resources of each of the apparatuses. Specifically, an information processing method according to the present technology is realized by the CPU loading a program configuring the software, that is stored in the ROM or the like, in the RAM and executing it. The program is installed in each apparatus via, for example, various recording media. Alternatively, the program may be installed in each apparatus via the Internet or the like.

Figure 2:
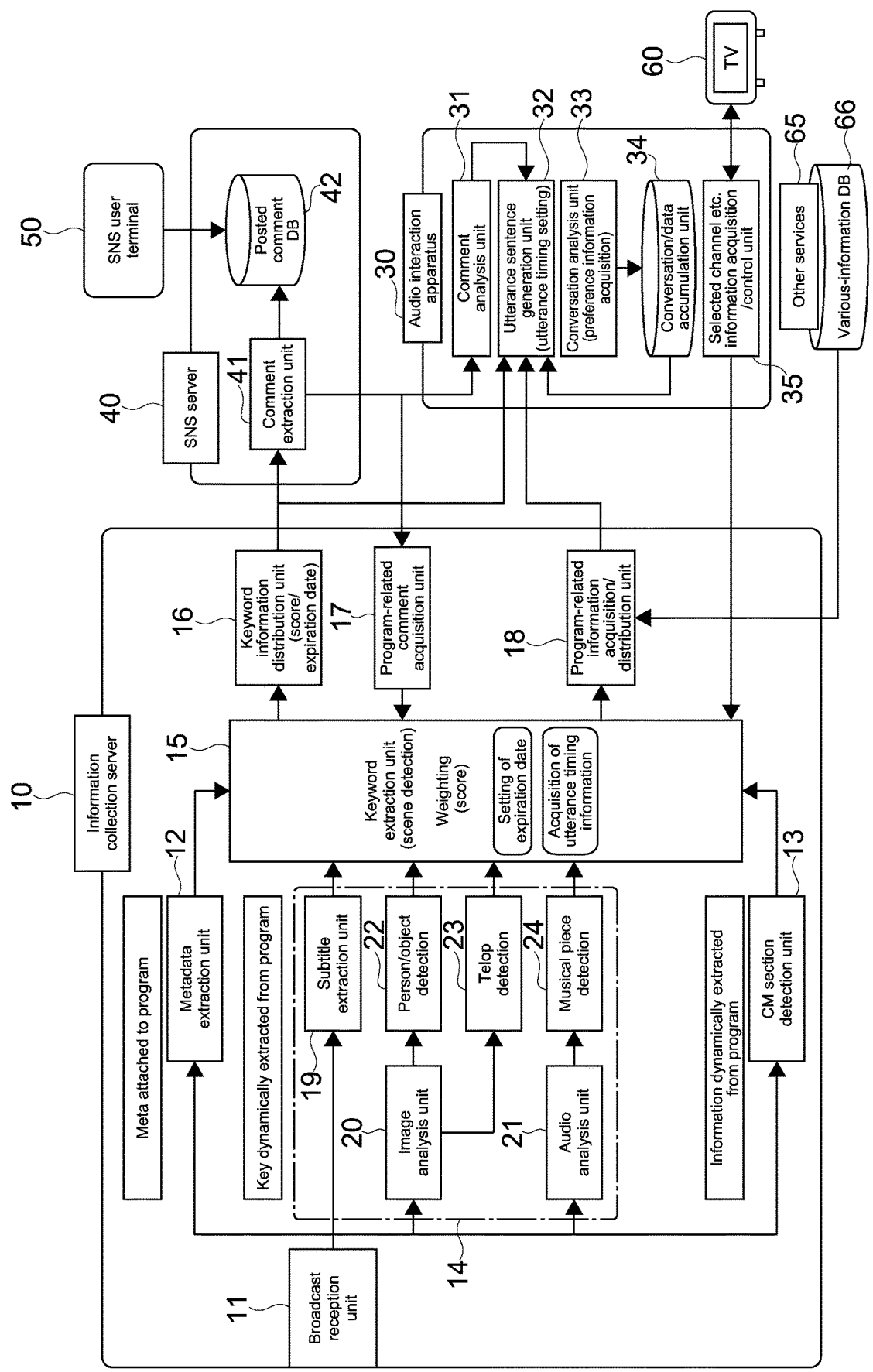
[FIG. 2] A block diagram showing a functional configuration example of an information collection server, an audio interaction apparatus, and an SNS server.

FIG. 2 is a block diagram showing a functional configuration example of the information collection server 10, the audio interaction apparatus 30, and the SNS server 40. Each of the functional blocks shown in FIG. 2 is configured by the CPU of each apparatus executing a predetermined program. It should be noted that dedicated hardware may be used as appropriate for realizing each of the functional blocks.

The information collection server 10 includes a broadcast reception unit 11, a metadata extraction unit 12, a CM section detection unit 13, a program analysis unit 14, a keyword extraction unit 15, a keyword information distribution unit 16, a program-related comment acquisition unit 17, and a program-related information acquisition/distribution unit 18.

The broadcast reception unit 11 receives program contents distributed from broadcast stations of terrestrial digital television broadcasting, CS digital broadcasting, BS digital broadcasting, and the like, for example. For example, metadata related to a program content, that has been generated in the broadcast station, is attached to the program content. The broadcast reception unit 11 is also capable of receiving an electronic program guide (EPG) from the broadcast station.

The metadata extraction unit 12 extracts the metadata attached to the program content. The metadata includes, for example, a channel, title, casts, broadcasting time, and general overview of a broadcast content of the program content, and the like. In addition, as the metadata, a time schedule from a start to end of the program content may be attached, so that positions (times) of a switch of respective scenes, CM sections, and the like can be extracted.

The CM section detection unit 13 detects positions of CM sections in the program content. The CM section is detected on the basis of, for example, a difference between data of a main video and data of a CM video. Alternatively, the CM section may be detected on the basis of a change point of a video or music, presence or absence of a watermark, and the like. Any other arbitrary technologies may be used as appropriate. It should be noted that in a case where the position of a CM section is attached as metadata as described above, the metadata is used.

The program analysis unit 14 analyzes various types of information included in a program content. In this embodiment, the program analysis unit 14 includes a subtitle extraction unit 19, an image analysis unit 20, and an audio analysis unit 21. The subtitle extraction unit 19 extracts subtitles in a program content.

The image analysis unit 20 detects a person/object 22 such as a cast included in a program content and an object being featured. Further, the image analysis unit 20 detects telops 23 displayed in respective scenes in the program content. A method of detecting a person/object and a telop is not limited, and an arbitrary technology may be used.

The audio analysis unit 21 detects a musical piece 24 played or sung by a performer or the like in a program content. Further, the audio analysis unit 21 detects a musical piece 24 broadcasted as a BGM of each scene. The musical piece detection may be executed using an arbitrary technology.

In addition to the musical piece, the audio analysis unit 21 may acquire contents of comments or narration spoken by casts, a narrator, and the like, that is, audio contents. Further, a cast who has made a comment or the like may be specified.

The keyword extraction unit 15 extracts, as one or more pieces of analysis information related to a program content, one or more analysis keywords on the basis of an analysis result output from the program analysis unit 14. The keyword extraction unit 15 also judges an effectivity of each of the one or more analysis keywords. In this embodiment, an expiration date is set for each of the analysis keywords, and the effectivity is judged on the basis of the expiration date.

The expiration date is typically a time after a predetermined period since a time when an analysis keyword is generated. In other words, in a case where a predetermined period has elapsed since the generation of an analysis keyword, that analysis keyword is judged as ineffective. Alternatively, a time that satisfies a predetermined condition, such as a switch to a CM section and a scene switch, may be set as the expiration date.

It should be noted that the detection of a scene switch is executed by the keyword extraction unit 15 on the basis of the analysis result from the program analysis unit 14. For example, a timing at which the detected person/object 22, telop 23, or the like switches drastically is detected as the scene switch. It should be noted that an arbitrary technology may be used for the scene detection, and metadata extracted by the metadata extraction unit 12 may also be used.

In a case where a scene switch is detected by the keyword extraction unit 15, a timing of that scene switch is acquired as utterance timing information. The acquired utterance timing information is transmitted to the audio interaction apparatus 30 as information for setting an utterance timing.

Further, the keyword extraction unit 15 judges an importance degree of the analysis keyword judged to be effective. Specifically, a judgment is made on how important each analysis keyword is, and weighting is executed in accordance with the judged importance degree. By this weighting, a scores is added to each analysis keyword.

The keyword information distribution unit 16 distributes the analysis keyword that has been extracted and judged to be effective by the keyword extraction unit 15 to the SNS server 40. At that time, the importance degree (score) and expiration date of each analysis keyword are also distributed.

In the SNS server 40, the program-related comment acquisition unit 17 acquires program-related comments collected on the basis of the analysis keyword judged to be effective. The program-related comments are included in content information according to this embodiment. The keyword information distribution unit 16 and the program-related comment acquisition unit 17 realize a collection unit according to this embodiment. It should be noted that the program-related comment acquisition unit 17 may distribute the acquired program-related comments to the audio interaction apparatus 30.

The program-related information acquisition/distribution unit 18 acquires program-related information related to a program content from various types of information providable by other services 65 on the network 1. These pieces of information are acquired on the basis of the analysis keyword judged to be effective. Without being limited to this, the program-related information may be acquired as appropriate on the basis of metadata or the like.

Information included in a various-information DB (database) 66 providable by other services 65 includes, for example, posted comments, images, moving images, music, and other various types of information of other SNSs. The program-related comments acquired by the SNS server 40 and the program-related information acquired from the various-information DB correspond to the content information on the network 1.

In this embodiment, the program analysis unit 14 and the keyword extraction unit 15 function as a first generation unit that analyzes a received content and generates one or more pieces of analysis information related to the content. The keyword extraction unit 15 also functions as a judgment unit and a detection unit in this embodiment.

SNS Server 40

The SNS server 40 includes a comment extraction unit 41 and a posted-comment DB 42. The comment extraction unit 41 extracts program-related comments from the posted-comment DB 42 on the basis of the analysis keyword distributed from the information collection server 10. Typically, a search is performed using the analysis keyword as a search word, and comments including the search word are extracted. It should be noted that the posted-comment DB 42 stores comments posted via the SNS user terminals 50.

The comment extraction unit 41 transmits the plurality of extracted program-related comments to the audio interaction apparatus 30. Alternatively, the program-related comments may be transmitted from the comment extraction unit 41 to the program-related comment acquisition unit 17 of the information collection server 10, and the program-related comments may be transmitted to the audio interaction apparatus 30 from the program-related comment acquisition unit 17.

The audio interaction apparatus 30 includes a comment analysis unit 31, an utterance sentence generation unit 32, a conversation analysis unit 33, a conversation/data accumulation unit 34, and a selected channel etc. information acquisition/control unit 35.

The comment analysis unit 31 analyzes the program-related comments transmitted from the SNS server 40 and extracts a keyword for generating an utterance sentence. In this embodiment, the comment analysis unit 31 extracts a keyword related to the analysis keyword used for extracting the program-related comments. For example, a keyword that co-occurs with the analysis keyword (co-occurrence expressions) is extracted. In addition, various keywords commented together with the analysis keyword in the program-related comments may be extracted. Examples of the extraction keyword to be extracted are listed below.

(Analysis keyword) "XX incident"→(Extracted keyword) "scary" "awful"

(Analysis keyword) "Ramen"→(Extracted keyword) "delicious" "(shop name) is popular"

(Analysis keyword) "(Name of actress)"→(Extracted keyword) "beautiful" "cute" "latest work released"

(Analysis keyword) "Typhoon"→(Extracted keyword) "XX" "Direct hit to XX region"

(Analysis keyword) "(Name of place)"→(Extracted keyword) "Landmark" "XX festival started"

(Analysis keyword) "(Title of song)"→(Extracted keyword) "(Name of singer)" "ranking"

A plurality of extraction keywords may be extracted with respect to one analysis keyword. In this case, the posted number of program-related comments including the respective extraction keywords may be calculated, and the respective extraction keywords may be evaluated on the basis of the number of posts. This makes it possible to grasp the most commented extraction keyword. It should be noted that a plurality of words may be included in the extraction keyword.

By extracting the keyword from the program-related comments, it becomes possible for many and unspecified service users using the SNS to extract subjective impressions and the like of the program content as an extraction keyword. As a result, it becomes possible to experience a pseudo conversation with other viewers viewing the program content.

Further, the comment analysis unit 31 is capable of judging an excitement degree related to the analysis keyword on the basis of the posted number of program-related comments collected in relation to the analysis keyword. For example, when the number of comments including an analysis keyword is larger than a predetermined threshold value (e.g., 1000 etc.), it is judged that many people are excited about the analysis keyword. In this case, the excitement degree is "high". Information on an excitement timing of the analysis keyword, that is, a timing at which the posted number becomes larger than a predetermined threshold value, is output to the utterance sentence generation unit 32 as utterance timing information.

The utterance sentence generation unit 32 generates an utterance sentence for starting a conversation with the user 5 on the basis of at least one of the one or more analysis keywords related to the program content and the content information including the program-related comments acquired by the SNS server 40 and the program-related information acquired from the various-information DB 66. In this embodiment, the utterance sentence generation unit 32 corresponds to a second generation unit.

In this embodiment, an utterance keyword is selected from the one or more analysis keywords. Then, an utterance sentence including the utterance keyword and a related keyword related to the utterance keyword is generated. For example, the extraction keyword extracted by the comment analysis unit 31 is set as the related keyword. Alternatively, a keyword related to the utterance keyword is extracted from program-related information including posted comments of other SNSs, images, moving images, music, various other types of information, and the like, and the keyword is set as the related keyword.

For example, related keywords such as "soup is black" and "neighborhood" may be extracted on the basis of an image of "ramen" selected as an utterance keyword, map information of a noodle shop, and the like. Further, related keywords such as "successful from child actor" and "great actress" may be extracted from "(name of actress)" as the utterance keyword, on the basis of profile information, award-winning history, and the like of that actress.

A method of generating an utterance sentence is not limited. For example, an utterance sentence may be generated by attaching a fixed phrase prepared in advance to an utterance keyword. For example, a fixed phrase that is in a co-occurrence relationship with an utterance keyword is selected from a plurality of fixed phrases, to thus generate an utterance sentence. Alternatively, the utterance sentence may be generated using only the analysis keyword, or the utterance sentence may be generated on the basis of only the program-related comment or program-related information.

Further, the utterance sentence generation unit 32 sets a timing at which the generated utterance sentence is to be uttered. As will be described later, in this embodiment, 3 logics are prepared for setting the utterance timing, and the utterance timing is set by selecting each of the logics as appropriate. In other words, the utterance sentence generation unit 32 also functions as a setting unit in this embodiment.

The conversation analysis unit 33 analyzes a content of the conversation made with the user 5. An utterance sentence after the second word is generated on the basis of the analysis result, and the conversation is continued. The conversation analysis is realized by, for example, an arbitrary audio recognition technology.

Also in this embodiment, the conversation analysis unit 33 acquires preference information of the user 5 on the basis of the content of the conversation. For example, in a case where various keywords such as a name of an actress, food, a name of a place, and sports are generated as analysis keywords of a program content, an utterance sentence such as "Do you like (analysis keyword)?" is generated and output. In a case where an answer to this utterance sentence is affirmative, the analysis keyword is stored as a preference keyword that represents what the user prefers. The preference keyword corresponds to a keyword related to preference information. Accordingly, preference information (preference keyword) related to a person, object, or the like that the user 5 likes can be acquired highly accurately in real time while viewing a program content.

Further, the preference information may be acquired on the basis of a viewing history, movement history, photograph analysis, and the like of the user 5 that are stored in the conversation/data accumulation unit 34 shown in FIG. 2. For example, a co-star, director, original author, and the like common to a content viewed in the past are stored as preference keywords. Further, places visited many times, a building that appears in many captured photographs, and the like are stored as the preference keywords. Other than that, a person, object, and the like preferred by the user 5 may be automatically estimated by an arbitrary method.

It is also possible to generate an utterance sentence with respect to the preference information estimated on the basis of the history information and confirm the preference of the user by a conversation. As a result, it becomes possible to cope with a change of a preference or the like and acquire a current preference as the preference information. The acquired preference information (preference) is stored in the conversation/data accumulation unit 34 and read out as appropriate by the utterance sentence generation unit 32.

In this embodiment, the conversation analysis unit 33 functions as an acquisition unit that acquires preference information of the user 5. It should be noted that a block for acquiring the preference information on the basis of history information and the like may be provided separate from the conversation analysis unit 33. In this case, the acquisition unit is realized by this block and the conversation analysis unit 33.

The selected channel etc. information acquisition/control unit 35 is connected to the television apparatus 60 and acquires various types of information including, for example, channel information of program contents currently being broadcasted. Further, the selected channel etc. information acquisition/control unit 35 is capable of controlling an operation of the television apparatus such as a channel switch. As a result, the audio interaction apparatus 30 can be used as a remote controller.

[Operation of Audio Interaction System]

Figure 3:
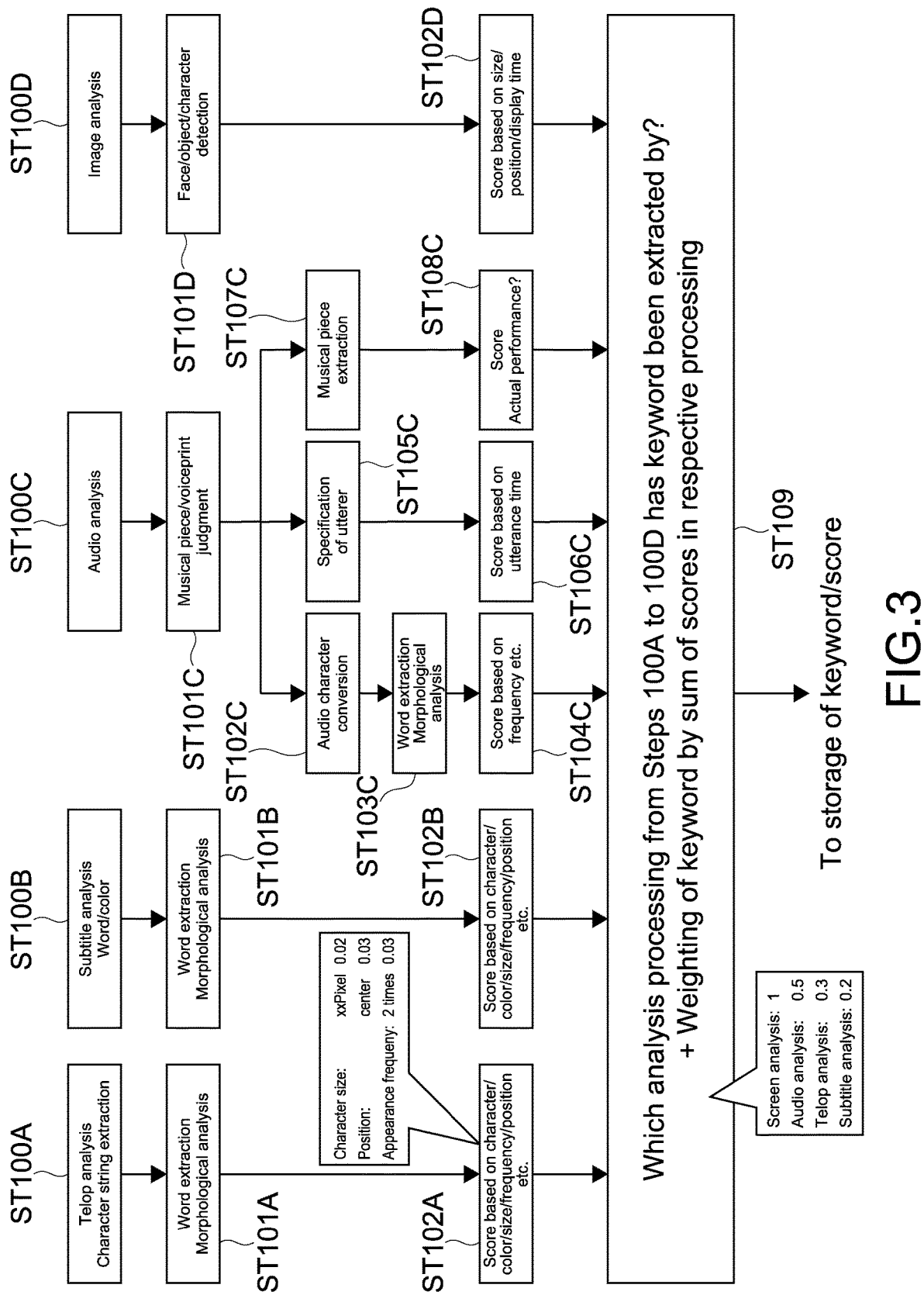
[FIG. 3] A flowchart showing an operation example of a keyword extraction unit of the information collection server.

An operation example from generation of an analysis keyword related to a program content to generation/utterance of an utterance sentence will be described. FIG. 3 is a flowchart showing an operation example of the keyword extraction unit 15 of the information collection server 10. Processing described below is executed with respect to a program content currently being viewed, on the basis of channel information transmitted by the selected channel etc. information acquisition/control unit 35.

A telop analysis (Step 100A), a subtitle analysis (Step 100B), an audio analysis (Step 100C), and an image analysis (Step 100D) are executed by the keyword extraction unit 15 on the basis of an analysis result obtained by the program analysis unit. These steps can be executed in parallel.

In the telop analysis, a character string is extracted from telops displayed during the program, and meaningful words are extracted by a morphological analysis or the like (Step 101A), for example. An importance level is judged for each extracted word, and a score is added. For example, the score is determined on the basis of the following parameters (Step 102A), though of course is not limited thereto.

Content of word . . . the stronger the meaning of a content is, the higher the score Character size (pixel) of word . . . the larger the size, the higher the score Display color of word . . . the more conspicuous color such as red the color is, the higher the score Appearance position on screen . . . the closer it is to prominent position (center of screen etc.), the higher the score Frequency of occurrence . . . the higher the number of appearances, the higher the score It should be noted that a specific numerical value calculation method is not limited, and the numerical values may be set as appropriate.

In the subtitle analysis, words, display colors thereof, and the like are detected from subtitles displayed during the program. First, words are extracted by a morphological analysis or the like, and a score is added to each of the words on the basis of the parameters described above and the like (Steps 101B and 102B).

In the audio analysis, a musical piece being played and a voiceprint of a comment uttered by a cast or the like are detected (Step 101C). Lyrics and comments of the musical piece being sung are converted into characters, and words are thus extracted (Steps 102C and 103C). A score is added to each of the words on the basis of an appearance frequency of the extracted word, and the like (Step 104C).

Further, utterers of the comments or the like are specified on the basis of the voiceprint judgment (Step 105C). A score is added to each of the specified utterers on the basis of an utterance time or the like (Step 106C). It should be noted that in this case, the analysis keyword to be extracted is typically a name of the utterer.

Further, the musical piece being played is extracted (Step 107C). A score is added to each musical piece on the basis of whether the performance of the musical piece is actual performance or reproduction of a CD sound source or the like (e.g., case of BGM etc.) (Step 108C). It should be noted that the analysis keyword to be extracted is typically a title of the musical piece.

In the image analysis, a face, object, character, and the like are detected (Step 101D). On the basis of a size, display position, display time, or the like of an image (partial image) including a target object such as a face and an object, a score is added to the detected face, object, and the like (Step 102D).

The analysis keyword to be extracted here is typically a name of a person, object, and the like in the partial image. However, in a case where an image search or the like can be performed with respect to a plurality of comments or the like in the SNS server 40, the partial image may be used as it is as one or more pieces of analysis information.

The keyword extraction unit 15 further executes weighting on the analysis keywords extracted by the respective analysis processing from Steps 100A to 100D (Step 109). First, a judgment is made on which analysis processing from Steps 100A to 100D the analysis keyword is extracted by, and a score is added on the basis of that judgment result. For example, weighting is performed such that a numerical value of the score becomes "image analysis>audio analysis>telop analysis>subtitle analysis", though of course is not limited thereto.

A sum of the score added in accordance with the type of the analysis processing and the score added in each processing is calculated as the score of each analysis keyword.

As described above, in this embodiment, by analyzing each of the telop, subtitles, audio, and image as a plurality of types of information included in the program content, one or more analysis keywords are generated as one or more pieces of analysis information. Then, on the basis of the type of information to be analyzed, the importance degree of each analysis keyword is judged, and a score is added. As a result, it becomes possible to collect program-related comments and the like with high accuracy in real time in accordance with the contents of the program content.

Further, as described above, in each of the analysis processing, parameters are used as appropriate, and weighting is performed finely. Accordingly, it becomes possible to collect program-related comments and the like with higher accuracy. As a result, it becomes possible to generate utterance sentences in accordance with the contents of the program content.

Figure 4:
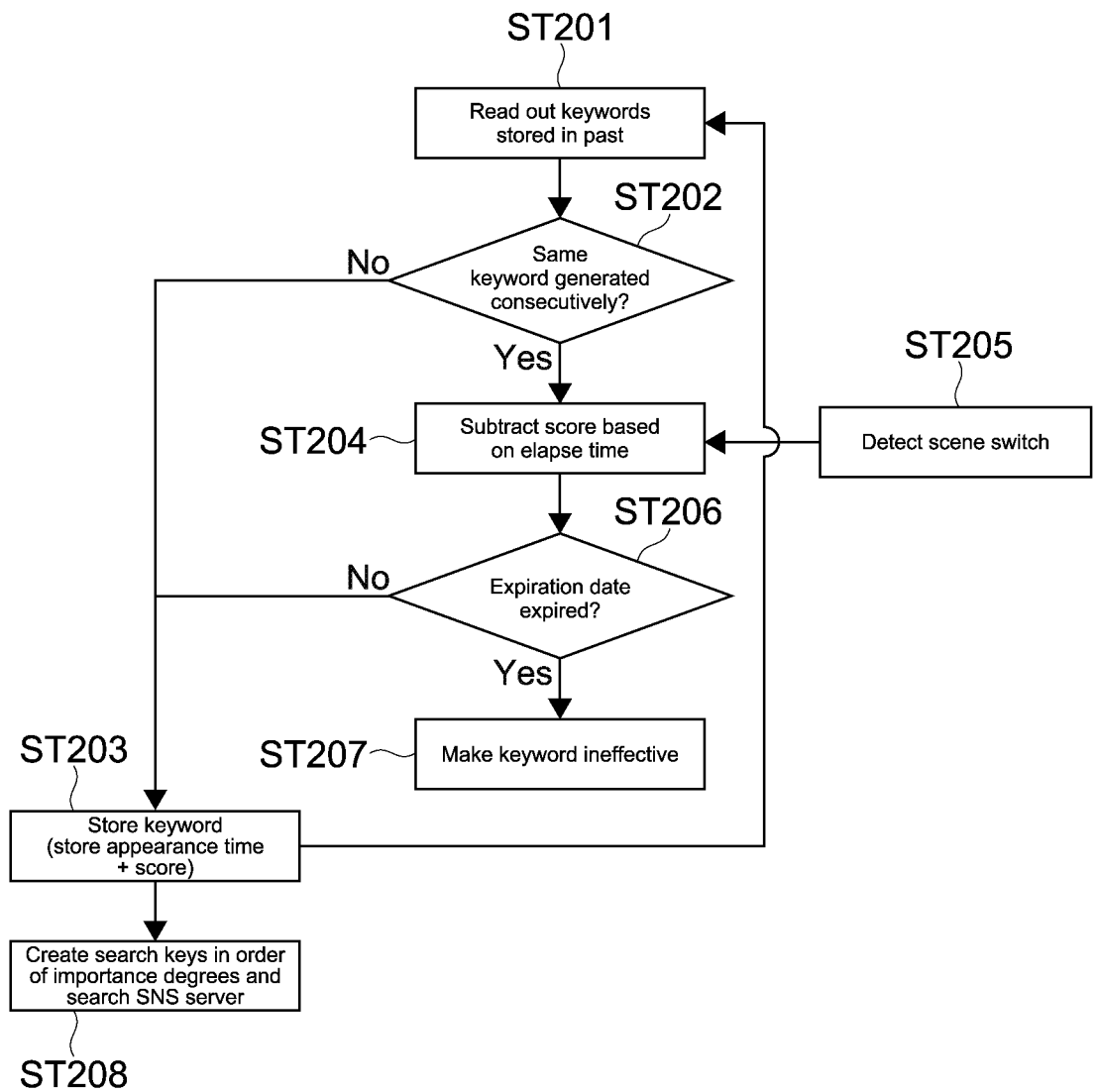
[FIG. 4] A flowchart showing an example of analysis keyword and score storage processing.

FIG. 4 is a flowchart showing an example of analysis keyword and score storage processing. The storage processing is executed for each of the analysis keywords generated in Step 109 of FIG. 3. First, all of the analysis keywords that have been stored last time are read out (Step 201).

Whether an analysis keyword generated this time is generated consecutively is judged on the basis of the read analysis keywords (Step 202). Specifically, in each of the analysis processing shown in FIG. 3, it is judged whether the same analysis keyword is generated consecutively. It should be noted that this typically corresponds to a case where the same analysis keyword is generated consecutively by the same analysis processing. Instead of this, a case where, in different analysis processing, the same analysis keyword is generated consecutively as a result may be regarded as the case where the analysis keyword is generated consecutively.

In a case where the analysis keyword is not generated consecutively (No in Step 202), the analysis keyword and the score are stored (Step 203). An appearance time of the analysis keyword is also stored. The appearance time corresponds to, for example, a numerical value obtained by multiplying an interval at which the content analysis processing is carried out (e.g., every second) by the number of times a keyword is generated consecutively. In this case, since the analysis keyword is generated for the first time, an interval time of 0 times, that is, 0 second is stored.

In a case where the analysis keyword is generated consecutively (Yes in Step 202), an interval time for one time is added to an appearance time stored in the past, and the appearance time up to the current generation, that is, an elapse time since the first generation, is calculated. Then, in accordance with the elapse time, the score calculated in Step 109 of FIG. 3 is subtracted (Step 204).

Normally, a program content includes a plurality of scenes, and the scenes are broadcasted while being switched sequentially. It is desirable for an analysis keyword corresponding to a new scene to be extracted when the scenes are switched. On the other hand, an analysis keyword generated after the scene switch is highly likely a fresh keyword that corresponds to the new scene, that is, matches contents of the content more.

On the basis of such a viewpoint, a score of the analysis keyword generated consecutively to some extent is subtracted so as to become smaller in proportion to a length of a duration. Further, in a case where a scene switch is detected while the analysis keyword is generated consecutively, that is, before expiration of an expiration date (Step 205), the score is additionally subtracted.

In addition to or instead of the scene switch, an additional subtraction of the score may be executed in accordance with a detection of a switch to a CM. This is based on a consideration that the scene switch is often performed across CMs. It should be noted that a specific score subtraction value and the like may be set as appropriate.

Next, whether the elapse time of the analysis keyword has exceeded the expiration date is judged, and the analysis keyword whose expiration date has expired is made ineffective (Yes in Step 206 to Step 207). The analysis keyword whose expiration date has not expired is stored together with the subtracted score and the appearance time (elapse time) (No in Step 206 to Step 203). In this way, by subtracting the score in accordance with the elapse time and judging an effectivity of the analysis keyword in accordance with the expiration date, it becomes possible to collect information with high accuracy in real time in accordance with the scene switch.

It should be noted that the analysis keyword may be made ineffective at a time point a scene switch is detected. In other words, the analysis keyword may be reset every time a scene is switched so that an analysis keyword is extracted again.

On the basis of the stored analysis keywords, search keys are created in the order of the importance degrees, and search processing with respect to the SNS server is executed (Step 208). Specifically, the analysis keywords and scores are transmitted to the SNS server 40, and the comment extraction unit 41 of the SNS server 40 extracts program-related comments reflecting the importance degrees.

Regarding the extraction reflecting the importance degrees, the extraction is typically executed such that an upper limit of the number of extractable comments is set, and a ratio of the numbers of program-related comments related to the respective analysis keywords becomes substantially equal to a rate of the scores representing the importance degrees of the respective analysis keywords. At that time, a threshold value may be set for the scores so that the program-related comments are extracted using only the analysis keyword having a score larger than the threshold value, though of course is not limited thereto.

Further, the program-related information acquisition/distribution unit 18 acquires, from the various-information DB 66 of the other services 65, various types of program-related information while reflecting the importance degrees of the analysis keywords. For example, in a case where a costume of a cast is extracted as an analysis keyword, the place of a shop where the costume can be purchased, a price of the costume, and the like are acquired. Various other types of information can also be acquired.

Figure 5:
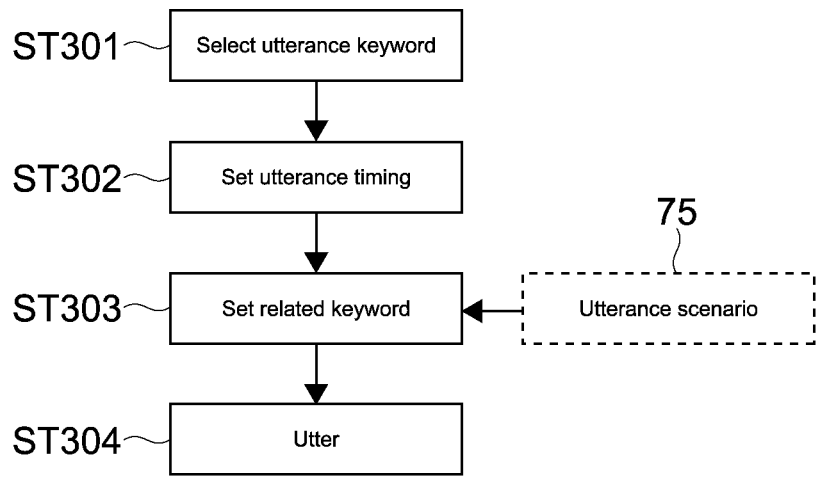
[FIG. 5] A flowchart showing an operation example of an utterance sentence generation unit of the audio interaction apparatus.

FIG. 5 is a flowchart showing an operation example of the utterance sentence generation unit 32 of the audio interaction apparatus 30. First, an utterance keyword is selected from one or more analysis keywords extracted by the keyword extraction unit 15 (Step 301).

A method of selecting an utterance keyword is not limited. For example, an utterance keyword is selected on the basis of the score added to each analysis keyword. Typically, the analysis keyword with a highest score is selected as the utterance keyword.

The utterance keyword may be selected on the basis of the posted number of program-related comments in relation to the respective analysis keywords, that is, the excitement degree. For example, an analysis keyword having a highest excitement degree is selected as the utterance keyword.

The utterance keyword may be selected on the basis of the preference information of the user 5 that is stored in the conversation/data accumulation unit 34. For example, preference keywords related to the preference information are classified by types such as a vehicle, an entertainer, and food. Then, an analysis keyword related to the type including the preference keyword most is selected as the utterance keyword.

In this embodiment, in a case where any of the one or more extracted analysis keywords matches with the preference keyword stored in the conversation/data accumulation unit 34, that analysis keyword is selected as the utterance keyword. As a result, in a case where a person or object that the user 5 prefers is broadcasted, that user can have a conversation about that person or object, and thus the user 5 can enjoy the program content more.

In addition, for example, the utterance keyword may be selected on the basis of an extraction order of the one or more analysis keywords. Alternatively, it is also possible to judge an analysis keyword that is currently being focused on the basis of the program-related information acquired from the various-information DB 66 of the other services 65, and select it as the utterance keyword. Further, the various selection methods described above may be combined as appropriate.

It should be noted that it is also possible to set the utterance keyword that has once been selected in the past as a non-selectable keyword and restrict it from being selected as the utterance keyword after that, or set it as the non-selectable keyword in a case where it is selected a predetermined number of times. By such processing, it becomes possible to prevent the same utterance sentence from being outputted many times.

Next, an utterance timing of the utterance sentence is set (Step 302). In this embodiment, 3 logics, that is, a "preference keyword utterance logic", an "excitement utterance logic", and a "scene switch utterance logic", are prepared and switched as appropriate.

Figure 6:
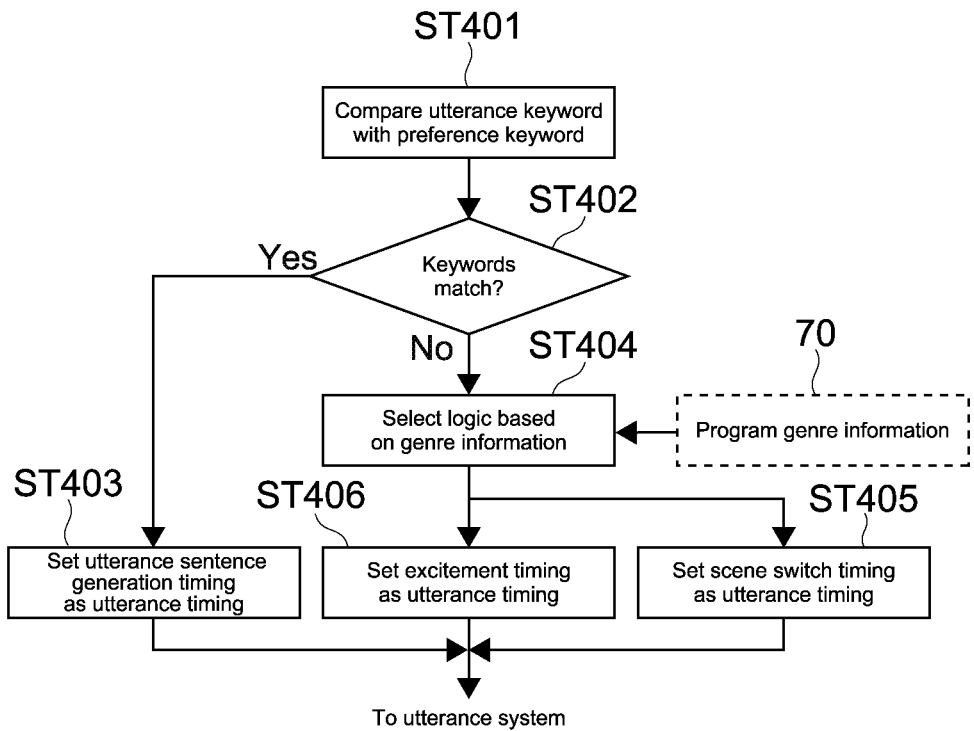
[FIG. 6] A flowchart showing an operation example of an utterance timing logic switch.

FIG. 6 is a flowchart showing an operation example of an utterance timing logic switch. FIGS. 7 are schematic diagrams for explaining the utterance timing in each logic. First, the selected utterance keyword is compared with the preference keyword stored in the conversation/data accumulation unit 34 (Step 401). In a case where there is a preference keyword that matches with the utterance keyword (Yes in Step 402), the utterance timing is set in accordance with the "preference keyword utterance logic" (Step 403).

Specifically, a timing at which an utterance sentence including the utterance keyword is generated is set as the utterance timing. Specifically, at a timing at which a related keyword is set in Step 303 of FIG. 5 and an utterance sentence is completed, the utterance sentence is output to the user (Step 304).

Figure 7A:
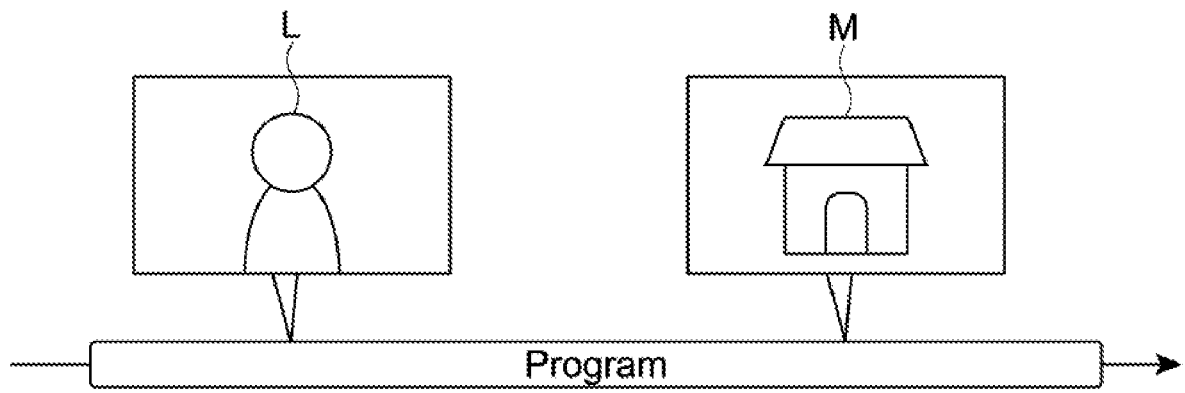
[FIGS. 7A, 7B and 7C] Schematic diagrams for explaining the utterance timing in each logic.

As shown in FIG. 7A, in this case, regarding a person L, a building M, and the like that the user 5 prefers, the utterance sentence is uttered at a timing at which the person L or the like appears regardless of the progression of a program content. For the user 5, at the timing at which the person L or the like that the user prefers appears, a conversation on that person or the like is started. As a result, an interest to the program content is also raised, his/her tension also becomes high, and a high viewing experience can be obtained.

It should be noted that in a case where an analysis keyword that matches with the stored preference keyword is selected in the utterance keyword selection processing, the "preference keyword utterance logic" may be selected without executing Steps 401 and 402 of FIG. 6.

In a case where the utterance keyword and the preference keyword do not match (No in Step 402), one of the "excitement utterance logic" and the "scene switch utterance logic" is selected on the basis of program genre information 70 (Step 404). The program genre information 70 can be judged on the basis of an analysis result from the program analysis unit 14, metadata extracted by the metadata extraction unit 12, and the like.

Figure 7B:
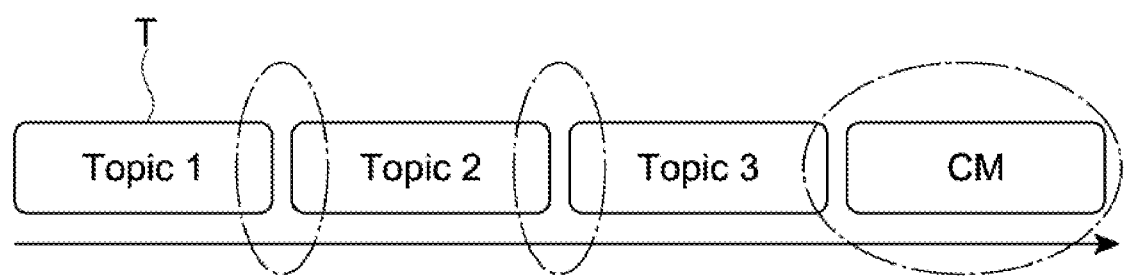
Figure 7C:
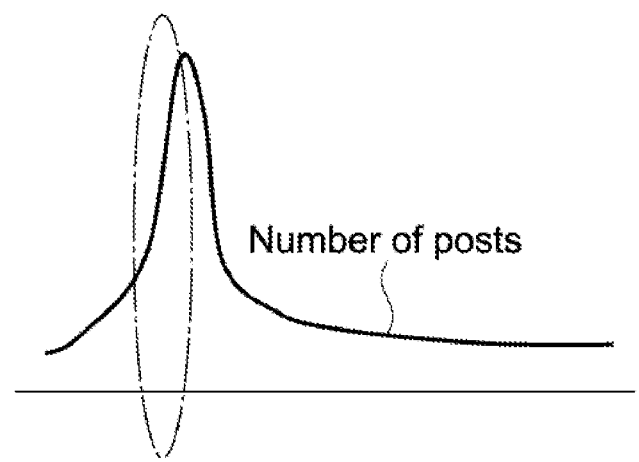

For example, in a case of a program of a genre in which a plurality of topics T are broadcasted sequentially, such as a news program, as shown in FIG. 7B, the "scene switch utterance logic" is selected (Step 405). Specifically, a timing at which each topic T is switched (including switch timing to CM) is set as the utterance timing. Accordingly, it becomes possible to start a conversation at an appropriate timing without hindering the user 5 from viewing contents of the news and the like (contents of each topic T). It should be noted that the switch timings of the topics T that are surrounded by alternate long and short dash lines in FIG. 7B and the switch timing to a CM correspond to a scene switch timing in this embodiment.

Further, in cases of programs of genres that are not of a program in which a plurality of topics are arranged, that is, programs of shows, movies, and the like and sports programs of soccer, rugby, and the like, for example, the "excitement utterance logic" is selected (Step 406). A timing at which an excitement degree related to the utterance keyword, that is surrounded by a constant dashed line in FIG. 7C, becomes high is set as the utterance timing. Accordingly, for example, at a timing that shows significant excitement, such as a climax scene of a movie and a scoring scene in soccer, a conversation about that can be started. Even the user 5 who has been spoken to can enjoy the program content with more enthusiasm without missing the excitement.

It should be noted that in a case where an utterance keyword having a high excitement degree is selected in the utterance keyword selection processing, a timing at which an utterance sentence including that utterance keyword is generated is set as the utterance timing.

A method of setting an utterance timing is not limited, and a method other than the method that uses the 3 logics above may be used, for example. For example, a timing at which broadcasting of a program content ends may be set as the utterance timing. Accordingly, it becomes possible to have a conversation about impressions and the like after the program is ended. Further, the utterance timing may be settable by the user 5.

When the utterance timing is set, a related keyword related to the utterance keyword is set (Step 303). As shown in FIG. 5, the related keyword is set on the basis of an utterance scenario 75. The utterance scenario 75 is information for setting related keywords so as to follow contents of a program content and includes the program-related comments, program-related information, metadata, and the like described above.

For example, an extraction keyword extracted from the program-related comments by the comment analysis unit 31 is set as the related keyword. At that time, an extraction keyword most posted with respect to the utterance keyword may be selected. Consequently, it becomes possible to start a conversation of contents according to impressions of other viewers viewing the program content.

Further, the related keyword may be set on the basis of program-related information including posted comments of other SNSs, images, moving images, music, various other types of information, and the like. For example, a keyword indicating a latest situation or the like of the utterance keyword may be set as the related keyword, on the basis of current-affairs information or the like. For example, "the rank of (title of song) is first place" or the like is used.

Alternatively, the related keyword may be set on the basis of contents of audio acquired by the audio analysis unit 21. For example, a keyword related to the utterance keyword, that is of a co-occurrence expression or the like, is extracted from audio including the utterance keyword and selected as the related keyword. Accordingly, it becomes possible to start a conversation according to contents of the program. Moreover, it becomes possible to start a conversation of contents according to subjective impressions and the like of casts and the like, and this may become a trigger for the user to state approval or disapproval, or the like to the casts. As a result, it becomes possible to enjoy the program content more.

In addition, a method of setting a related keyword is not limited. For example, a fixed phrase may be selected as the related keyword. In this case, although there is a possibility that the contents will not follow the program scenario 75, it is also possible to enjoy a conversation including that. Furthermore, the related keyword may be set on the basis of metadata extracted by the metadata extraction unit 12.

When the related keyword is set, an utterance sentence including the utterance keyword and the related keyword is uttered at a set utterance timing. Accordingly, a conversation related to the program content is started between the audio interaction apparatus 30 and the user 5 (Step 304).

As described above, in the audio interaction system 100 according to this embodiment, content information on the network 1 is collected on the basis of one or more analysis keywords related to a program content. Then, an utterance sentence is generated on the basis of the one or more analysis keywords and the content information. Accordingly, it becomes possible to hold a conversation on various types of information related to the program content with the user 5 viewing the program content. As a result, it becomes possible to provide a high-quality viewing experience to the user 5.

Furthermore, the audio interaction apparatus 30 may utter information that the user 5 does not know. By knowing the information, the user can enjoy the program content with more interest.

Second Embodiment

An audio interaction system according to a second embodiment of the present technology will be described. In descriptions below, descriptions on parts having configurations and operations similar to those of the audio interaction system 100 described in the above embodiment are omitted or simplified.

In the above embodiment, the information processing server 10 generates one or more analysis keywords related to a content and collects content information related to the one or more analysis keywords from the SNS server 40. Then, the audio interaction apparatus 30 generates an utterance sentence on the basis of at least one of the one or more keywords and the collected content information.

In other words, the information collection server 10 is configured as an information processing apparatus according to the present technology, which includes a reception unit, a first generation unit, and a collection unit. Further, the audio interaction apparatus 30 is configured as another information processing apparatus according to the present technology, which includes a second generation unit.

A single apparatus including both functions of the information collection server 10 and the audio interaction apparatus 30 may be configured. In other words, an apparatus including the reception unit, the first generation unit, the collection unit, and the second generation unit may be realized as the information processing apparatus according to the present technology.

For example, the information collection server 10 shown in FIGS. 1 and 2 is provided with the function of the audio interaction apparatus 30. Then, the information collection server 10 may execute the selection of an utterance keyword, the setting of an utterance timing, and the setting of a related keyword, and the generated utterance sentence may be transmitted to the audio interaction apparatus 30. In this case, preference information acquired by the audio interaction apparatus 30 may be transmitted to the information collection server 10 as appropriate.

On the other hand, the audio interaction apparatus 30 may include the function of the information collection server 10. In other words, the generation of one or more analysis keywords, the collection of content information, and the generation of an utterance sentence may be executed by the television apparatus 60 and the audio interaction apparatus 30 arranged close to the user 5.

Figure 8:
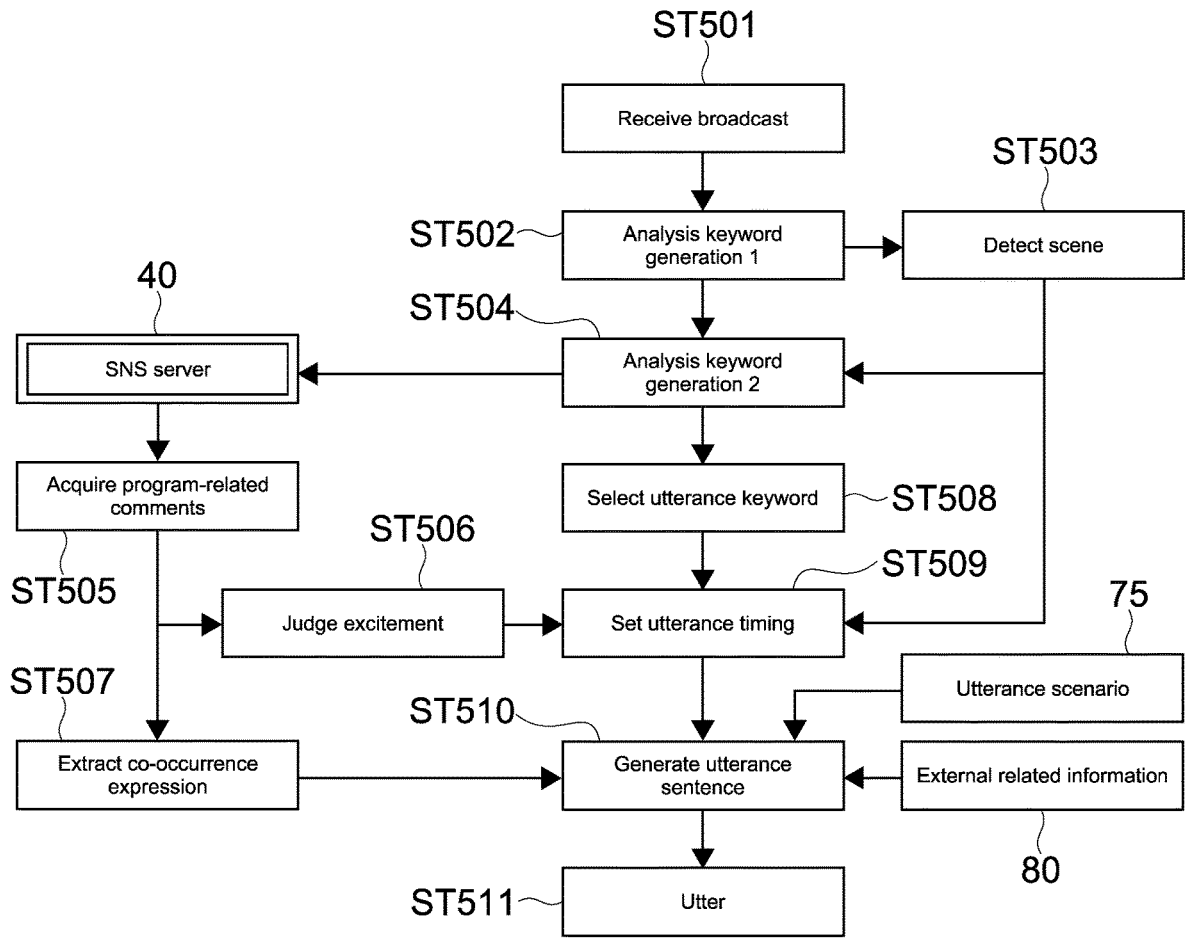
[FIG. 8] A flowchart showing an operation example of an information processing apparatus including a reception unit, a first generation unit, a collection unit, and a second generation unit.

FIG. 8 is a flowchart showing an operation example of the information processing apparatus including the reception unit, the first generation unit, the collection unit, and the second generation unit. When a program content is received (Step 501), analysis keywords are generated (Step 502). A scene switch is detected on the basis of the analysis keywords (Step 503), and effectivities of the analysis keywords generated in Step 502 are judged and scores are set on the basis of the scene switch (Step 504). The analysis keyword judged to be effective is transmitted to the SNS server 40.

On the basis of the analysis keywords, program-related comments collected by the SNS server 40 are acquired (Step 505), and an excitement degree of each analysis keyword is judged (Step 506). Further, co-occurrence expressions are extracted from the program-related comments (Step 507).

As the utterance sentence generation processing, an utterance keyword is selected from the analysis keywords (Step 508), and an utterance timing is set (Step 509). The utterance timing is set on the basis of, for example, the logics described above.

A related keyword is set and an utterance sentence is generated on the basis of the co-occurrence expression extracted from the program-related comments, the utterance scenario 75, and various types of external information 80 related to the program content (Step 510). The generated utterance sentence is uttered in accordance with the set utterance timing (Step 511). This makes it possible to provide a high-quality viewing experience to the user.

Third Embodiment

An audio interaction system according to a third embodiment of the present technology will be described. In the audio interaction system, a video image and audio acquired by an in-vehicle camera (image pickup apparatus) mounted on a vehicle are analyzed, to generate one or more analysis keywords (one or more pieces of analysis information). An effectivity and importance degree of the one or more analysis keywords are judged, and comments posted on the SNS and information of other services (content information), that are related to a subject captured by the in-vehicle camera, are acquired on the basis of the analysis keyword judged to be effective.

An audio interaction apparatus 330 is provided in the vehicle, and an utterance sentence is generated on the basis of at least one of the one or more analysis keywords and the content information and output to the user. Accordingly, the user can hold a conversation about, for example, a famous building or the like while watching the surrounding landscape, and thus the user can enjoy the drive even more. It should be noted that audio guidance or the like may be executed on the basis of the one or more analysis keywords and the content information. Accordingly, an extremely meaningful sightseeing tour becomes possible while further enjoying the landscape. It should be noted that the audio interaction apparatus 30 may be realized by a navigation apparatus.

Figure 9:
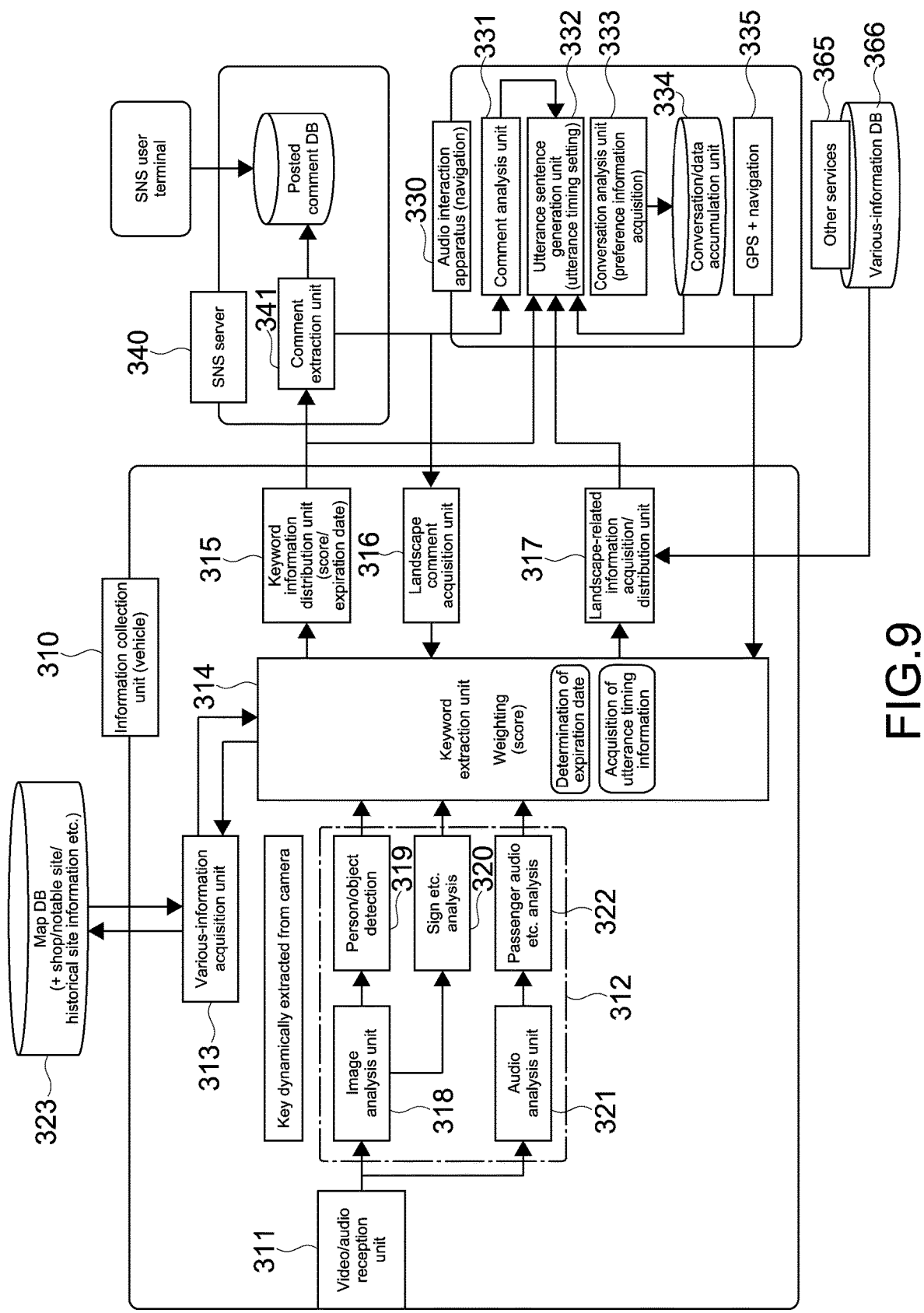
[FIG. 9] A block diagram showing a functional configuration example of an information collection unit, an audio interaction apparatus, and an SNS server according to a third embodiment.

FIG. 9 is a block diagram showing a functional configuration example of an information collection unit 310, the audio interaction apparatus 330, and an SNS server 340 according to this embodiment. The information collection unit 310 is a block capable of collecting content information on the network, and is mounted on a vehicle.

The information collection unit 310 includes a video/audio reception unit 311, a landscape analysis unit 312, a various-information acquisition unit 313, a keyword extraction unit 314, a keyword information distribution unit 315, a landscape comment acquisition unit 316, and a landscape-related information acquisition/distribution unit 317.

The video/audio reception unit 311 receives a video and audio (hereinafter, referred to as captured content) from an in-vehicle camera (not shown). The landscape analysis unit 312 analyzes various types of information included in the captured content. In this embodiment, a subject in the captured content, specifically, a person/object 319, is detected and a sign etc. 320 or the like is analyzed by an image analysis unit 318. In addition, an audio analysis unit 321 analyzes audio etc. 322 of a passenger aboard the vehicle.

The keyword extraction unit 314 extracts one or more analysis keywords related to the captured content on the basis of an analysis result output from the landscape analysis unit 312. For example, names of notable sites, historic sites, shops, and the like, such as a castle and a shrine captured in the captured content, are extracted. Alternatively, names of notable sites and regions or a name of a row of cherry blossom trees and the like may be extracted from a conversation with the passenger. Furthermore, a name of a float related to a famous festival, and the like may also be extracted.

The keyword extraction unit 314 judges an effectivity of the extracted analysis keywords. For example, from a viewpoint that a landscape captured by the in-vehicle camera changes as appropriate, the effectivity is judged while setting a predetermined period as an expiration date. Alternatively, in a case where a size of a subject in an image (frame image) captured in real time is smaller than a predetermined threshold value, the analysis keyword related to the subject is made ineffective.

Further, the keyword extraction unit judges an importance degree of the analysis keyword judged to be effective and sets a score thereof. The score is calculated as appropriate such that the importance degree of the subject mainly captured in real time becomes high. For example, the larger the size of the subject in the image is, the higher the score.

Further, map information is acquired from a map DB 323 shown in FIG. 9, and buildings and the like in a periphery of a current position of the vehicle calculated using a GPS or the like are detected. Then, a high score is given to the buildings and the like. It should be noted that in the example shown in FIG. 9, a GPS and navigation function 335 is mounted on the audio interaction apparatus 330 so that GPS information is transmitted from the audio interaction apparatus 330 to the information collection unit 310, though of course is not limited thereto.

Further, a high score is given to an analysis keyword that appears frequency in the conversation with the passenger. The scores may be given by various other methods. For example, a line of sight of the passenger may be detected on the basis of a video of the in-vehicle camera, and the extraction of analysis keywords, the setting of scores, and the like may be executed on the basis of the detection result.

Moreover, for the analysis keyword that is extracted consecutively, the score may be subtracted in accordance with an elapse time since the extraction. Also, a subtraction rate may be increased in a case where the landscape to be captured is switched. Alternatively, the analysis keywords may be reset in accordance with the switch of landscapes.

The extracted analysis keywords and scores are transmitted to the SNS server 340, and the comment extraction unit 341 collects landscape-related comments related to the landscape. The landscape-related comments are collected so as to reflect the importance degrees (scores), and are transmitted to the audio interaction apparatus 330.

Landscape-related information related to the landscape is acquired from a various-information DB 366 of other services 365 on the basis of the analysis keywords and scores. For example, a history of a notable site, information on a person related to the notable site, beautiful images of notable sites and historical sites, and the like are acquired. The landscape-related information 233 is transmitted to the audio interaction apparatus 330.

The audio interaction apparatus 330 includes a comment analysis unit 331, an utterance sentence generation unit 332, a conversation analysis unit 333, and a conversation/data accumulation unit 334, executes a selection of an utterance keyword, a setting of an utterance timing, and a setting of a related keyword, and generates an utterance sentence. The selection of an utterance keyword and the setting of a related keyword are executed by, for example, the methods described in the above embodiment. Typically, a timing at which an utterance sentence is generated is set as the utterance timing. In other words, a conversation is started as soon as an utterance sentence related to the landscape is generated. In addition, the utterance timing may be set as appropriate on the basis of a driving state, such as a state of waiting for a traffic light and a stopped state.

It should be noted that the landscape-related information and the like may be displayed on a display (not shown) of the audio interaction apparatus 330. Alternatively, audio guidance may be performed on the basis of the landscape-related information. Accordingly, the user can sense information of a subject matching the surrounding landscape with high accuracy in real time.

Other Embodiments

The present technology is not limited to the embodiments above, and various other embodiments can be realized.

Regarding the setting of an utterance timing, it is also possible to store a program broadcast content in a memory so that a configuration of the program (scene switch etc.) can be detected in advance. After that, the program content may be broadcasted, and an utterance timing may be set on the basis of information on the detected program configuration. This makes it possible to set an appropriate utterance timing that does not obstruct viewing of program contents.

A score (weighting) may be set for the preference information (preference keyword) described above. A high score is set for a preference keyword that the user prefers very much, and a low score is set for a preference keyword that the user prefers only a little. Accordingly, it becomes possible to preferentially generate an utterance sentence related to what the user prefers very much.

For example, in a case where a conversation is started between the audio interaction apparatus and the user, audio from a television apparatus that is acquired by a microphone or the like of the audio interaction apparatus may be canceled. As a result, it becomes possible to acquire only audio emitted from the user and accurately analyze uttered contents. For example, by using a well-known microphone canceling technology or the like, components of television audio can be canceled from audio acquired by the microphone or the like.

In a case where the audio interaction apparatus can be used as a remote controller, communication of channel information of a program currently being viewed may be prohibited between the television apparatus and the audio interaction apparatus. This is because the channel information of a program currently being viewed can be acquired by the user performing a channel selection operation on the audio interaction apparatus. The utterance sentence generation processing described above only needs to be executed on the basis of the program channel information.

The audio interaction apparatus may analyze an uttered content of the user including an answer to an utterance sentence to judge a target of interest of the user. Then, an assist operation in which information on the target of interest is provided so as to assist an action desired by the user may be executed.

Examples of the target of interest include objects such as decors and electrical appliances, people such as entertainers and athletes, places such as tourist sites and famous buildings, and hobbies such as sports and musical instruments, though of course is not limited thereto.

For example, the target of interest of the user is judged in a conversation started by an utterance sentence generated by the audio interaction apparatus. The audio interaction apparatus provides information on the network, assist information, and the like regarding the target of interest. For example, in a case where the target of interest is an object, information that enables the object to be purchased is provided. For example, the television apparatus is switched to a channel of a program content that sells objects. Alternatively, in a case where the television apparatus is connected to the network and is capable of acquiring a webpage, a homepage of a sales site that sells objects is displayed.

In a case where the target of interest is a person, a schedule of a concert or game, or a program or website that enables a ticket to be purchased, is displayed as information that enables the user to meet that person. In a case where the target of interest is a place, a program in which a map can be checked or a homepage of a travel website where a ticket can be purchased is displayed as information that enables the user to go to that place.

In a case where the target of interest is a hobby, a website that enables sporting equipment or musical instrument to be purchased or a homepage of a school that teaches techniques is displayed as information that enables the user to learn that hobby. In addition, a program or homepage where a moving image or the like about the target of interest can be viewed may also be displayed.

In a case where the user purchases an object, makes a reservation, or the like, inputs of various types of information may be assisted by the audio interaction apparatus. For example, the assist operation may be executed such that an application for a purchase or the like can be input only by interactions of audio. As a result, an interest of the user becomes deeper, and the viewing of contents also becomes fun.

It should be noted that in the case where the user purchases an object, makes a reservation, or the like, information that indicates which program content has been viewed so as to become the target of interest may be provided to the sales site or service provider side by the audio interaction apparatus. For example, it is assumed that the user has reserved a hotel that the user is interested in. At that time, information on a program content that broadcasted that hotel is transmitted to the hotel side. As a result, the hotel side can presume what the user expects from contents of the program content, and thus can provide a service that meets the expectations. As a result, satisfaction of the user becomes high, and an evaluation of the hotel also becomes high.

The type of contents is not limited, and the present technology may be applied to other contents of radio broadcasting, Internet television, and the like. In addition, the present technology is not limited to the in-vehicle camera and can also be applied to contents captured by a video camera carried by the user and contents captured by a camera mounted on a glasses-type wearable computer (head mounted display: HMD).

How to judge an importance degree of analysis information generated by analyzing a content is not limited and only needs to be set as appropriate using arbitrary parameters and the like. For example, the importance degree may be determined on the basis of metadata or the like attached in advance to a program content. For example, processing of setting the importance degree to become higher for analysis information related to a main cast included in metadata, or the like is also possible. In the case of analyzing contents of the in-vehicle camera, the importance degree may be determined on the basis of map information and navigation information (route information etc.).

In the case of extracting analysis information on the basis of subtitles included in a program content, subtitles are sometimes displayed with a delay regarding the actual scene progression. Therefore, analysis information only needs to be extracted in consideration of these delay times. In some cases, the delay time differs depending on a genre of the program content, and thus it becomes possible to collect information and generate utterance sentences with high accuracy by considering that point.

Logo marks of programs, telops for promoting programs, and the like may be constantly displayed during broadcasting. Therefore, these pieces of information may be identified so that scores are subtracted for analysis information extracted from these pieces of information.

An information search algorithm such as Tf-idf (TF: Term Frequency) (IDF: Inverse Document Frequency) and LSI (Latent Semantic Indexing) may be used as appropriate as a technology for detecting keywords.

The audio interaction system according to the present technology may be applied to a CM itself broadcasted in a CM section. Speifically, one or more pieces of analysis information are generated by analyzing a CM content, and an effectivity and importance degree thereof are judged. Posted comments and content information related to the one or more pieces of analysis information are collected on the basis of the effectivity and importance degree. An utterance sentence related to the CM is generated on the basis of these pieces of information, and a conversation with the user is started. Consequently, for example, it becomes possible to have a conversation about a topical CM and the like.

Various types of information analyzed from a content in real time, such as images, audio, and GPS information, may be used as the analysis information generated for collecting content information, without being limited to the keywords described above.

The audio interaction apparatus according to the present technology may be realized by installing an application constituted of a program according to the present technology in a smartphone or a tablet terminal. Also, the audio interaction apparatus according to the present technology may be structured by a robot apparatus including AI (artificial intelligence), that is, a humanoid robot apparatus or the like, for example.

At least two of the feature portions according to the present technology described above can be combined. In other words, various feature portions described in the respective embodiments may be arbitrarily combined without distinguishing the embodiments from one another. Moreover, the various effects described above are mere examples and should not be limited thereto, and other effects may also be exerted.

It should be noted that the present technology can also take the following configurations.

(1) An information processing apparatus, including:
 a reception unit that receives a content;
 a first generation unit that analyzes the received content and generates one or more pieces of analysis information related to the content;
 a collection unit that collects content information related to the content on a network on the basis of the one or more pieces of generated analysis information; and
 a second generation unit that generates an utterance sentence on the basis of at least one of the one or more pieces of analysis information and the collected content information.

(2) The information processing apparatus according to (1), in which
 the content is a program content, and
 the first generation unit generates one or more keywords related to the content by analyzing each of a plurality of types of information included in the program content.

(3) The information processing apparatus according to (2), in which
 the second generation unit selects an utterance keyword from the one or more generated keywords and generates the utterance sentence including the utterance keyword and a related keyword related to the utterance keyword.

(4) The information processing apparatus according to (3), in which
the second generation unit sets the related keyword on the basis of the collected content information.
(5) The information processing apparatus according to (3) or (4), in which
the second generation unit sets a keyword that co-occurs with the utterance keyword as the related keyword.
(6) The information processing apparatus according to any one of (3) to (5), in which
the generation unit is capable of acquiring a content of audio included in the program content, and
the second generation unit sets the related keyword on the basis of a content of audio including the utterance keyword.
(7) The information processing apparatus according to any one of (2) to (6), further including:
a detection unit capable of detecting a scene switch in the program content; and
a judgment unit that judges an effectivity of each of the one or more generated keywords on the basis of the detected scene switch,
in which
the second generation unit generates the utterance sentence on the basis of a keyword judged as effective by the judgment unit.
(8) The information processing apparatus according to any one of (2) to (7), further including
an acquisition unit that acquires preference information of a user viewing the content,
in which
the second generation unit selects, in a case where the one or more generated keywords include a keyword related to the preference information, the keyword as the utterance keyword.
(9) The information processing apparatus according to any one of (1) to (8), further including
a setting unit that sets an utterance timing at which the generated utterance sentence is to be uttered.
(10) The information processing apparatus according to (9), in which
the content is a program content,
the information processing apparatus further includes a detection unit capable of detecting a scene switch in the program content, and
the setting unit sets a timing of the scene switch as the utterance timing.
(11) The information processing apparatus according to (9) or (10), further including
an acquisition unit that acquires preference information of a user viewing the content,
in which
the first generation unit generates one or more keywords related to the content by analyzing each of a plurality of types of information included in the content,
the second generation unit selects, in a case where the one or more generated keywords include a keyword related to the preference information, the keyword as an utterance keyword, and
the setting unit sets a timing at which the utterance sentence including the keyword related to the preference information is generated, as the utterance timing.
(12) The information processing apparatus according to any one of (9) to (11), in which
the first generation unit generates one or more keywords related to the content by analyzing each of a plurality of types of information included in the content,
the collection unit collects comments that are related to the one or more generated keywords and have been posted using a communication service, and
the setting unit sets the utterance timing on the basis of the collected number of posted comments related to an utterance keyword selected by the second generation unit.
(13) The information processing apparatus according to (8), in which
the acquisition unit acquires the preference information on the basis of an answer to the utterance sentence.
(14) The information processing apparatus according to (1), in which
the content is a captured content captured by an image pickup apparatus,
the first generation unit generates one or more keywords related to one or more subjects included in the captured content by analyzing the captured content, and
the second generation unit generates the utterance sentence on the basis of at least one of the one or more generated keywords and the content information collected on the basis of the one or more keywords.
(15) The information processing apparatus according to any one of (1) to (14), in which
an utterance content of a user viewing the content including an answer to the utterance sentence is analyzed, to judge a target of interest of the user and provide information related to the target of interest.
(16) The information processing apparatus according to (15), in which
the information related to the target of interest includes information that enables the target of interest to be purchased, information that enables the user to meet the target of interest, information that enables the user to go to the target of interest, and information that enables the user to learn the target of interest.

REFERENCE SIGNS LIST 1 network
5 user
10 information collection server
11 broadcast reception unit
14 program analysis unit
15, 314 keyword extraction unit
17 program-related comment acquisition unit
18 program-related information acquisition/distribution unit
30, 330 audio interaction apparatus
31, 331 comment analysis unit
32, 332 utterance sentence generation unit
33, 333 conversation analysis unit
34, 334 conversation/data accumulation unit
40, 340 SNS server
41, 341 comment extraction unit
42 posted-comment DB
50 SNS user terminal
60 television apparatus
100 audio interaction system
310 information collection unit
311 video/audio reception unit
312 landscape analysis unit
313 various-information acquisition unit
316 landscape comment acquisition unit
317 landscape-related information acquisition/distribution unit

The invention claimed is:

1. An information processing apparatus, comprising:
a reception unit that receives a content;
a first generation unit that analyzes the received content, generates one or more datum of analysis information related to the content and generates one or more keywords related to the content by analyzing each of a plurality of types of information included in the content;
a collection unit that collects content information related to the content on a network on the basis of the one or more datum of generated analysis information; and
a second generation unit that generates an utterance sentence based on at least one of the one or more datum of analysis information and the collected content information and that selects an utterance keyword from the one or more generated keywords based at least on a score indicative of an importance degree of the utterance keyword and generates the utterance sentence including the utterance keyword and a related keyword selected based on content associated with the utterance keyword.

2. The information processing apparatus according to claim 1, wherein
the content is a program content, and
the first generation unit generates the one or more keywords by analyzing each of a plurality of types of information included in the program content.

3. The information processing apparatus according to claim 1, wherein
the second generation unit sets the related keyword based on the collected content information.

4. The information processing apparatus according to claim 1, wherein
the second generation unit sets a keyword that co-occurs with the utterance keyword as the related keyword.

5. The information processing apparatus according to claim 1, wherein
the generation unit is capable of acquiring a content of audio included in the program content, and
the second generation unit sets the related keyword based on a content of audio including the utterance keyword.

6. The information processing apparatus according to claim 2, further comprising:
a detection unit capable of detecting a scene switch in the program content; and
a judgment unit that judges an effectivity of each of the one or more generated keywords on the basis of the detected scene switch,
wherein
the second generation unit generates the utterance sentence based on a keyword judged as effective by the judgment unit.

7. The information processing apparatus according to claim 2, further comprising
an acquisition unit that acquires preference information of a user viewing the content,
wherein
the second generation unit selects, in a case where the one or more generated keywords include a keyword related to the preference information, the keyword as the utterance keyword.

8. The information processing apparatus according to claim 1, further comprising
a setting unit that sets an utterance timing at which the generated utterance sentence is to be uttered.

9. The information processing apparatus according to claim 8, wherein
the content is a program content,
the information processing apparatus further comprises a detection unit capable of detecting a scene switch in the program content, and
the setting unit sets a timing of the scene switch as the utterance timing.

10. The information processing apparatus according to claim 8, further comprising
an acquisition unit that acquires preference information of a user viewing the content,
wherein
the first generation unit generates one or more keywords related to the content by analyzing each of a plurality of types of information included in the content,
the second generation unit selects, in a case where the one or more generated keywords include a keyword related to the preference information, the keyword as an utterance keyword, and
the setting unit sets a timing at which the utterance sentence including the keyword related to the preference information is generated, as the utterance timing.

11. The information processing apparatus according to claim 8, wherein
the first generation unit generates one or more keywords related to the content by analyzing each of a plurality of types of information included in the content,
the collection unit collects comments that are related to the one or more generated keywords and have been posted using a communication service, and
the setting unit sets the utterance timing based on the collected number of posted comments related to an utterance keyword selected by the second generation unit.

12. The information processing apparatus according to claim 7, wherein
the acquisition unit acquires the preference information based on an answer to the utterance sentence.

13. The information processing apparatus according to claim 1, wherein
the content is a captured content captured by an image pickup apparatus,
the first generation unit generates one or more keywords related to one or more subjects included in the captured content by analyzing the captured content, and
the second generation unit generates the utterance sentence based on at least one of the one or more generated keywords and the content information collected on the basis of the one or more keywords.

14. The information processing apparatus according to claim 1, wherein
an utterance content of a user viewing the content including an answer to the utterance sentence is analyzed, to judge a target of interest of the user and provide information related to the target of interest.

15. The information processing apparatus according to claim 14, wherein
the information related to the target of interest includes information that enables the target of interest to be purchased, information that enables the user to meet the target of interest, information that enables the user to go to the target of interest, and information that enables the user to learn the target of interest.

16. An information processing method executed by a computer, comprising:
receiving a content;
analyzing the received content;
generating one or more datum of analysis information related to the content;
generating one or more keywords related to the content by analyzing each of a plurality of types of information included in the content;
collecting content information related to the content on a network based on the one or more datum of generated analysis information; and
generating an utterance sentence on the basis of at least one of the one or more datum of analysis information and the collected content information;
selecting an utterance keyword from the one or more generated keywords based at least on a score indicative of an importance degree of the utterance keyword; and
generating the utterance sentence including the utterance keyword and a related keyword selected based on content associated with the utterance keyword.

17. A non-transient computer readable medium containing program instructions for causing one or more computing devices to perform a method of:
receiving a content;
analyzing the received content;
generating one or more datum of analysis information related to the content;
generating one or more keywords related to the content by analyzing each of a plurality of types of information included in the content;
collecting content information related to the content on a network on the basis of the one or more datum of generated analysis information
generating an utterance sentence based on at least one of the one or more datum of analysis information and the collected content information
selecting an utterance keyword from the one or more generated keywords based at least on a score indicative of an importance degree of the utterance keyword; and
generating the utterance sentence including the utterance keyword and a related keyword selected based on content associated with the utterance keyword.

* * * * *